(12) United States Patent
Fukuhara et al.

(10) Patent No.: US 7,331,225 B2
(45) Date of Patent: Feb. 19, 2008

(54) NON-CONTACT TYPE LIQUID LEVEL SENSOR

(75) Inventors: Toshiaki Fukuhara, Shimada (JP); Kenichi Tanaka, Shimada (JP)

(73) Assignee: Yazaki Corporation, Tokyo (JP)

( * ) Notice: Subject to any disclaimer, the term of this patent is extended or adjusted under 35 U.S.C. 154(b) by 71 days.

(21) Appl. No.: 11/123,027

(22) Filed: May 6, 2005

(65) Prior Publication Data
US 2005/0247124 A1 Nov. 10, 2005

(30) Foreign Application Priority Data
May 7, 2004 (JP) ............................ P2004-138588

(51) Int. Cl.
*G01F 23/32* (2006.01)
(52) U.S. Cl. ....................................................... 73/317
(58) Field of Classification Search .............. 73/290 R, 73/305, 306, 307, 308, 314, 317; 361/284
See application file for complete search history.

(56) References Cited

U.S. PATENT DOCUMENTS

| | | | | |
|---|---|---|---|---|
| 4,829,247 A | * | 5/1989 | Wallrafen | 324/207.12 |
| 4,986,124 A | * | 1/1991 | Byrne et al. | 73/317 |
| 5,396,802 A | * | 3/1995 | Moss | 73/722 |
| 6,058,760 A | * | 5/2000 | Van Heyningen | 73/1.79 |
| 6,199,428 B1 | * | 3/2001 | Estevez-Garcia et al. | 73/305 |
| 6,354,132 B1 | * | 3/2002 | Van Heyningen | 73/1.79 |
| 6,439,067 B1 | * | 8/2002 | Goldman et al. | 73/862.333 |
| 6,508,119 B2 | * | 1/2003 | Beck, II | 73/291 |
| 6,564,632 B2 | * | 5/2003 | Ross, Jr. | 73/317 |
| 6,871,541 B2 | * | 3/2005 | Weisse | 73/314 |
| 6,972,558 B1 | * | 12/2005 | Robinson | 324/207.22 |
| 2003/0084720 A1 | * | 5/2003 | Ross | 73/317 |
| 2004/0003660 A1 | | 1/2004 | Fukuhara et al. | |
| 2004/0079152 A1 | | 4/2004 | Sorenson et al. | |

FOREIGN PATENT DOCUMENTS

| | | | |
|---|---|---|---|
| DE | 19751210 A1 | * | 5/1999 |
| EP | 0 295 609 A2 | | 12/1988 |
| EP | 1 376 077 A2 | | 1/2004 |
| JP | 2002-206945 A | | 7/2002 |
| JP | 2002-206959 A | | 7/2002 |

\* cited by examiner

*Primary Examiner*—Hezron Williams
*Assistant Examiner*—John Fitzgerald
(74) *Attorney, Agent, or Firm*—Sughrue Mion, PLLC

(57) ABSTRACT

A non-contact type liquid level sensor according to the invention has an electromagnetic shield plate mounted on a housing for blocking effects from an external magnetic field onto a magnetoelectric converting element.

3 Claims, 6 Drawing Sheets

NON-CONTACT TYPE LIQUID LEVEL SENSOR

BACKGROUND OF THE INVENTION

The present invention relates to a non-contact type liquid level sensor and, more particularly, to a non-contact type liquid level sensor which can convert the motion of a float into a change in magnetic flux for detection with high accuracy and which is hence appropriate for an application to an automotive fuel tank and the like.

For example, in a non-contact type liquid level sensor, which is installed in an automotive fuel tank of an automobile for detection of the volume of stored liquid fuel, an annular magnet adapted to rotate in response to the movement of a float is disposed within a frame. A Hall-effect element, which is a magnetoelectric converting element, is disposed within the same plane as a plane where the annular magnet is disposed and at a central portion of the magnet, and the Hall-effect element detects a change in magnetic flux density due to the rotating magnet and then converts the change so detected into an electric signal, whereby a liquid level is designed to detected (for example, refer to Patent Document 1).

In addition, there is a non-contact type liquid level sensor in which a magnet holder, to which the magnet is fixed, is rotatably held by a holding means formed on a surface of a frame, and a pair of cores and a Hall-effect element provided in a gap portion between the cores are disposed within the frame so as to detect a change in magnetic flux density due to the rotation of the magnet (for example, refer to Patent Document 2).

In the non-contact type liquid level sensors disclosed in the patent documents 1 and 2, the Hall-effect element is disposed within the same plane as the plane where the magnet is disposed (Patent Document 1), or the magnet holder is rotatably held by the holding means formed on the surface of the frame (Patent Document 2), so that the thickness and production cost of the non-contact type liquid level sensors are attempted to be reduced.

In addition, in both of the non-contact type liquid level sensors disclosed in the patent documents 1 and 2, the Hall-effect element detects a change in magnetic field of the magnet adapted to rotate in response to the movement of the float and then outputs a magnetoelectric conversion signal (an electric signal) corresponding the change so detected. Due to this, the non-contact liquid level sensor and the Hall-effect element in the interior of the sensor are, as shown in FIGS. 6 and 7, is exposed directly to an external magnetic field from the periphery thereof (an external magnetic field) to thereby be subjected to effects thereof. This external magnetic field results from electric equipment and system in the vicinity of a portion where the fuel tank is placed and a disposition system, in addition to a fuel pump module P including a fuel pump which is placed within the fuel tank. Then, this external magnetic field imposes direct effects on the Hall-effect element within the non-contact type liquid level sensor 20.

Patent Document 1:JP-A-2002-206959 (pages 4 to 5, FIG. 1)

Patent Document 2:JP-A-2002-206945 (pages 3 to 4, FIG. 1)

However, an external magnetic field like this changes the output characteristics held by the Hall-effect IC itself and deteriorates the detection accuracy of a liquid level. Consequently, normal output characteristics that would be obtained in a state where no external magnetic field exists cannot be obtained. FIG. 8 illustrates output characteristics of a Hall-effect IC with and without an external magnetic field. According to what is illustrated therein, when there exists no external magnetic field in the vicinity of the portion where the fuel tank is placed, an output of a predetermined sensitivity can be obtained with respect to the rotational angle of the magnet as shown by a solid line X, whereas when there exists an external magnetic field, the external magnetic field acts on the Hall-effect IC and an output therefrom changes as shown by a dotted line Y. As a result, there are caused problems that the output change with respect to the rotational angle of the magnet is small, that the detection sensitivity is deteriorated and that the result of measurement of a liquid level lacks reliability.

SUMMARY OF THE INVENTION

The invention was made in view of the problematic situations and an object thereof is to realize the stabilization of outputs from the magnetoelectric converting element by avoiding the effects of the external magnetic field onto the magnetoelectric converting element and high reliability in the result of measurement of a liquid level backed up the stabilization so realized. In addition, another object of the invention is to realize the stabilization of outputs from the magnetoelectric converting element without disturbing an electromagnetic function given to the magnetoelectric converting element by the magnet itself.

In order to accomplish the above object, a non-contact type liquid level sensor of the present invention is characterized by having the following arrangement.

(1) A non-contact type liquid level sensor comprising:
  a housing;
  a rotational shaft that is rotatably provided in the housing;
  a magnet that is fixed to an outer circumferential surface of the rotational shaft in such a manner as to rotate together with the rotational shaft;
  a pair of stators that are disposed in the housing so as to face to an outer circumferential surface of the magnet;
  a magnetoelectric converting element, which is disposed in the housing, for detecting a change in magnetic flux density that occurs within the stators in association with the rotation of the magnet, converting the change into an electric signal and outputting the electric signal; and
  an electromagnetic shield plate that is mounted on the housing, and prevents the magnetoelectric converting elements from being affected by an external magnetic field.

(2) A non-contact type liquid level sensor according to (1), wherein the electromagnetic shield plate is disposed in such a manner as to cover the stators and the magnetoelectric converting element.

(3) A non-contact type liquid level sensor according to (2), wherein a part of the electromagnetic shield plate is provided at a position which is parallel to an inspection surface of the magnetoelectric converting element, and which covers the stators.

(4) A non-contact type liquid level sensor according to (1), wherein the electromagnetic shield plate has a shape conserving a magnetic field of the magnet.

(5) A non-contact type liquid level sensor according to (1), wherein the electromagnetic shield plate has a notched portion facing to the magnet and the rotational shaft.

(6) A non-contact type liquid level sensor according to (1), wherein the electromagnetic shield plate is disposed at a position conserving a magnetic field of the magnet.

(7) A non-contact type liquid level sensor according to (1), wherein the magnetoelectric converting element comprises a Hall-effect IC.

(8) A non-contact type liquid level sensor according to (7), wherein the Hall-effect IC comprises a memory that has information for correcting magnetoelectric conversion characteristics.

(9) A non-contact type liquid level sensor according to (1) further comprising:

a float arm that comprises one distal end on which a float is provided, and the other distal end which is supported at the rotational shaft.

According to the non-contact type liquid level sensor that is constructed as has been described above, since the electromagnetic shield plate prevents the direct effects of the external magnetic field onto the stators and the magnetoelectric converting element, only the magnetic field generated by the magnet can be applied to the magnetoelectric converting element via the stators. Consequently, a change in output from the magnetoelectric converting element can be stabilized to thereby make highly reliable the result of measurement of a liquid level in association with the movement of the float.

According to the non-contact type liquid level sensor that is constructed as has been described above, the magnetic field of the magnet is prevented from passing through the electromagnetic shield plate acting as a flux path so as not to be diffused, and is converged to the stators and the magnetoelectric converting element to thereby prevent deterioration of the output from the magnetoelectric converting element.

According to the non-contact type liquid level sensor that is constructed as has been described above, since a magnetoelectric conversion output can be processed in a signal processing circuit in the interior thereof, a liquid level measurement value signal can be inputted into a measuring instrument as a signal corrected into a value corresponding to the liquid level, whereby even in the event that part of the external magnetic field leaks slightly, the display of an accurate liquid level which is compensated for such a leak can be implemented.

According to the non-contact type liquid level sensor that is constructed as has been described above, a magnetic flux detection signal corresponding to a measuring instrument that is similar to one that would result when there exists no external magnetic field can be outputted by performing a signal process for compensating for the deterioration in output characteristics due to the mounting of the electromagnetic shield plate, whereby even in the event that part of the external magnetic field leaks slightly, the display of an accurate liquid level which is compensated for such a leak can be implemented.

The non-contact type liquid level sensor according to the invention can prevent the direct effects of the external magnetic field resulting from the magnetic field generating components onto the magnetoelectric converting element by the electromagnetic shield plate, whereby the magnetic field from the magnet which rotates in response to the movement of the float can be detected with high sensitivity and high accuracy from the magnetoelectric converting element.

DETAIL DESCRIPTION OF PREFERRED EMBODIMENTS

Figure 1:
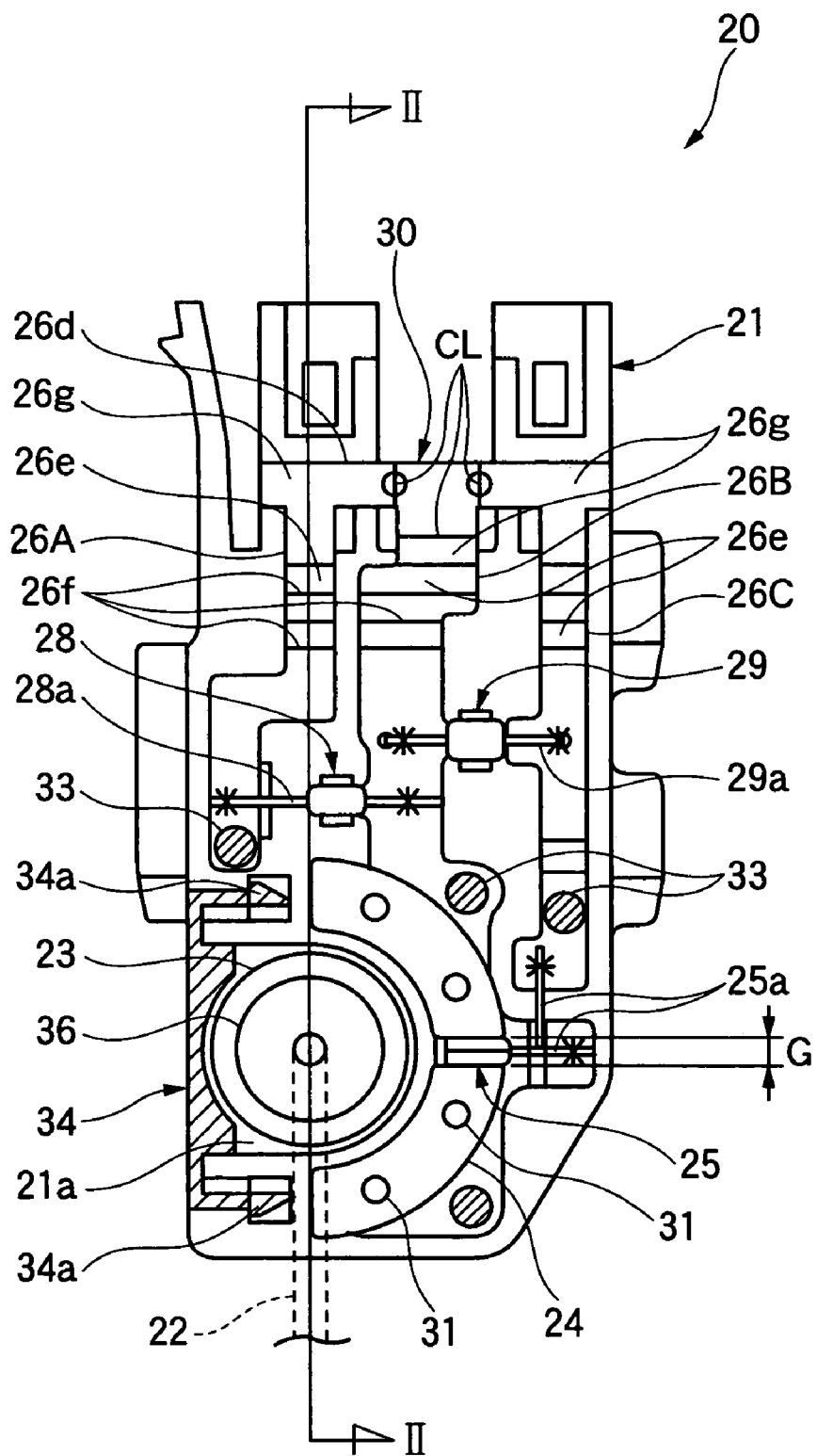
FIG. 1 is a front view of a non-contact liquid level sensor according to an embodiment of the invention with a front side thereof being deleted.

Hereinafter, an embodiment of a non-contact type liquid level sensor according to the invention will be described in detail based on the accompanying drawings. FIG. 1 is a plan view of a non-contact type liquid level sensor which is an embodiment of the invention, in which for the sake of easy understanding, a front side of a housing is deleted so as to make an inserted terminal assembly visible, and FIG. 2 is a sectional view taken along the line II-II in FIG. 1 so as to be viewed in a direction indicated by arrows at ends of the line.

Figure 2:
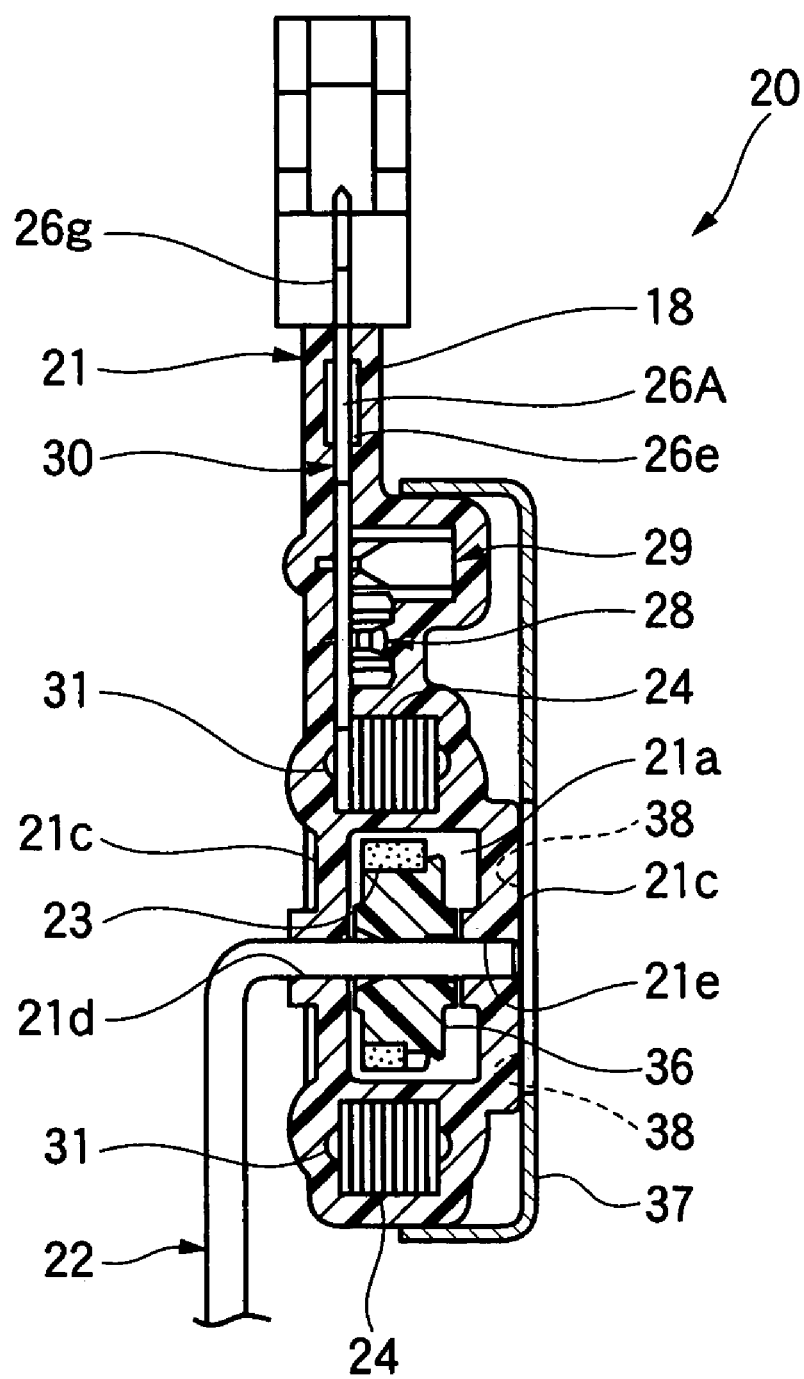
FIG. 2 is a vertical sectional view taken along the line II-II in FIG. 1 as viewed in a direction indicated by arrows at ends of the line.

As shown in FIGS. 1 and 2, in the non-contact type liquid level sensor 20, which is the embodiment of the invention, a terminal assembly 30 is insert molded in a housing 21, and almost all portions of the terminal assembly 30 excluding portions for external connection 26g are embedded in the housing 21.

The terminal assembly 30 is made up of terminals 26A, 26B, 26C, a magnetoelectric converting element 25, a resistor 28, a capacitor 29 and a pair of stators 24, which are assembled integrally to the assembly 30. The terminals 26A, 26B, 26C make up part of an electric circuit and are intended to transmit an electric signal detected by the magnetoelectric converting element 25 to the outside, and the three terminals 26A, 26B, 26C having different shapes, which are formed by pressing a conductive sheet metal, are made as a set.

Upper ends of the respective terminals 26A, 26B, 26C are formed in such a manner as to be connected to a belt-like carrier 26d. The belt-like carrier 26d is cut along a cutting line CL after the terminals 26A, 26B, 26C have been insert molded into the housing 21.

By cutting the terminals like this, the terminals 26A, 26B, 26C are separated from one another, so that the separated terminals are made to function as independent terminals. The upper ends of the respective terminals 26A, 26B, 26C constitute portions for external connection 26g after the belt-like carrier 26d has been cut therefrom.

A plurality of V-shaped grooves 26f are formed in the vicinity of the portions for external connection 26g of the terminals 26A, 26B, 26C and seal locations 26e which are embedded in the housing 21 when the terminals 26A, 26B, 26C are insert molded into the housing 21.

Then, the insert molding of the terminal assembly 30 (the terminals 26A, 26B, 26C) is performed after a seal coat agent 18 has been applied to the seal locations 26e which includes the V-shaped grooves 26f, whereby the sealing of a gap between the terminals 26A, 26B, 26C and the housing 21 is ensured.

The pair of stators 24, which are made of a magnetic material and each formed into a plate-like member that has a shape of substantially a quarter of a circle, are disposed at an end portion of the terminal 26B in such a manner as to form substantially a semi-circular shape and are clamped with four clamping pins 31 so as to be fixed to the terminal 26B, whereby the pair of stators 24 are disposed to face to an outer circumferential surface of the magnet 23 and to surround the outer circumference of the magnet 23 through substantially 180 degrees when the non-contact type liquid level sensor 20 is built up.

As the magnetic material constituting each of stators 24, silicone sheet steel, iron, stainless steel of martensite system, and the like are raised as examples. Note that there is no limitation on the manner in which the pair of stators 24 are fixed to the terminal 26B, and hence welding or any other fixing methods can be adopted provided that the pair of stators 24 can be fixed strongly and rigidly.

The magnetoelectric converting element 25 such as a Hall-effect element and a Hall-effect IC is disposed in a gap G formed between end faces of the pair of stators 24 in such a manner as to be held between the pair of stators 24. A lead wire 25a of the magnetoelectric converting element 25 is spot welded to the terminals 26B and 26C for electric connection thereto.

In addition, lead wires 28a, 29a of the resistor 28 and the capacitor 29 are spot welded to the terminals 26A, 26B and terminals 26B, 26C, respectively, for electric connection thereto. Namely, an electric circuit is formed by the terminals 26A, 26B, 26C, the magnetoelectric converting element 25, the resistor 28 and the capacitor 29.

As shown in FIGS. 1 and 2, in the terminal assembly 30 that is built up as has been described above, after the seal coat agent 18 has been applied to the seal locations 26e including the V-shaped grooves 26f in the terminals 26A, 26B, 26C, the housing 21 is formed by insert molding of a synthetic resin such as polyacetal, whereby almost all the portions of the terminal assembly 30 excluding the portions for external connection 26g are embedded in the housing 21.

By adopting the insert molding, the terminals 26A, 26B, 26C, the magnetoelectric converting element 25, the resistor 28, the capacitor 29 and the pair of stators 24 are fixed in a more ensured fashion by the synthetic resin which constitutes the housing 21, whereby the respective relative positions thereof are caused to change in no case.

Since the terminal assembly 30 is embedded in the synthetic resin excluding the portions for external connection 26g and the seal coat agent 18 is applied to the seal locations 26e in the vicinity of the portions for external connection 26g which constitute portions for connection with the outside so as to seal the gap between the terminal assembly 30 and the housing 21, the terminal assembly 30 is cut off from the outside in an ensured fashion so as to prevent the leakage of liquid, whereby the electric circuit is protected from fuel or the like.

As shown in FIG. 1, a substantially semi-circular magnet accommodating portion 21a having an opening opened in a side thereof is formed in the housing 21 in such a manner as to face the pair of stators 24. Through holes 21d, 21e are formed in both side walls 21c of the magnet accommodating portion 21a, respectively, on the same axial center.

A rotational shaft 36, which is supported on a float arm 22, is rotatably disposed within the magnet accommodating portion 21a, and the ring-like magnet 23 is fitted on an outer circumferential surface of the rotational shaft 36. The magnet 23 is, for example, a ferrite magnet which is double-pole magnetized in a radial direction after magnetic powder is molded into an annular shape and is then calcined, and is fixed to the rotational shaft 36 via press fit, bonding and the like.

A magnet accommodating portion cover 34 made of synthetic resin is mounted in the opening in the magnet accommodating portion 21a so as to cover the opening. Namely, the magnet accommodating portion cover 34 is assembled in the housing 21 by bringing a pawl 34a formed on the magnet accommodating portion cover 34 into engagement with a locking hole formed in the housing 21 to thereby prevent the intrusion of foreign matters into the interior of the magnet accommodating portion 21a.

Figure 3:
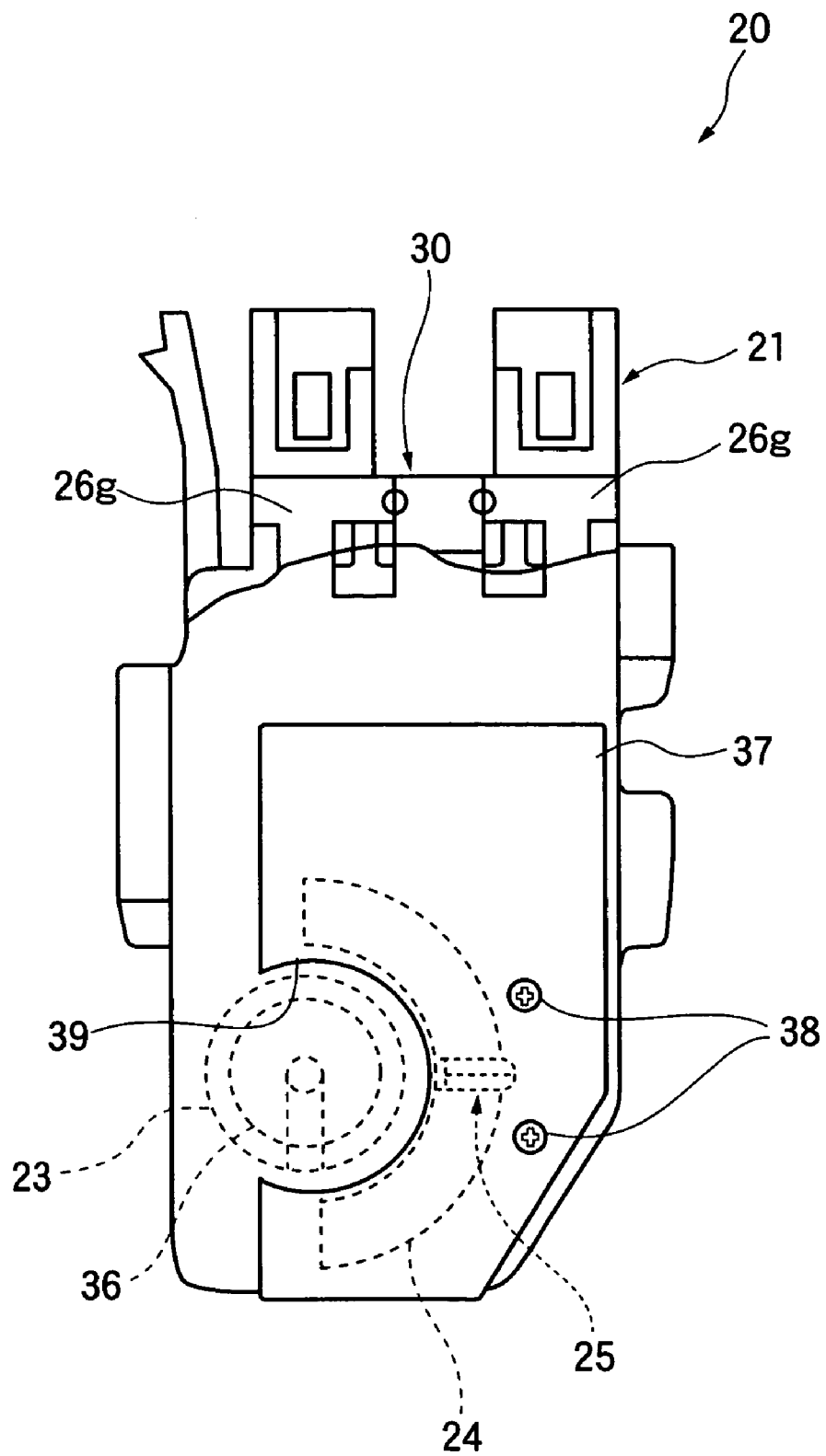
FIG. 3 is a front view of the non-contact liquid level sensor shown in FIG. 1.

In addition, as shown in FIGS. 2 and 3, an electromagnetic shield plate 37 is mounted on one side of the housing 21, that is, on an outer surface of the housing which is opposite to a side of the housing from which the float arm 22 is made to protrude towards the outside. This electromagnetic shield plate 37 is made of a ferromagnetic metal such as sheet iron and is mounted on the housing with, for example, a screw 38 in such a manner as to cover the stators 24 and the magnetoelectric converting element 25. Note that a part of the electromagnetic shield plate 37 is provided at a position which is parallel to an inspection surface of the magnetoelectric converting element 25 and which covers the stators 24.

As shown in FIG. 3, the electromagnetic shield plate 37 has substantially a semi-circular notched portion 39 at a location in the housing 21 which faces to the magnet 23 and the rotational shaft 36. This notched portion 39 is formed in such a manner as to correspond to a predetermined area in the vicinity of the magnet 23 and the rotational shaft 36.

Consequently, the electromagnetic shield plate 37 not only protects the magnet 23 and the rotational shaft 36 from the external magnetic field but also avoids a risk that the electromagnetic shield plate 37 itself disturbs or deflects the magnetic field of the magnet 23.

Due to this, the electromagnetic shield plate 37 is mounted on the outer surface of the housing 21 in such a manner as to keep a certain position where the electromagnetic shield plate 37 is kept from approaching the magnet 23 too closely and is disposed in such a manner as to become parallel to the inspection surface of the magnetoelectric converting element 25 so as to cover the stators 24, whereby the disturbance to or deflection of the magnetic field of the magnet 23 can be avoided more effectively.

The function of the embodiment will be described.

As shown in FIG. 1, the non-contact type liquid level sensor 20 is disposed within the storage tank such as a fuel tank of an automobile, and when the liquid level of gasoline stored in the storage tank changes, a float (not shown) moves vertically and rotates the rotational shaft 36 together with the magnet 23. When the magnetic flux density which passes through the magnetoelectric converting element 25 changes in association with the rotation of the magnet 23, the magnetoelectric converting element 25 detects the change and converts the change into an electric signal for outputting to the outside via the terminals 26A, 26B, 26C.

Figure 8:
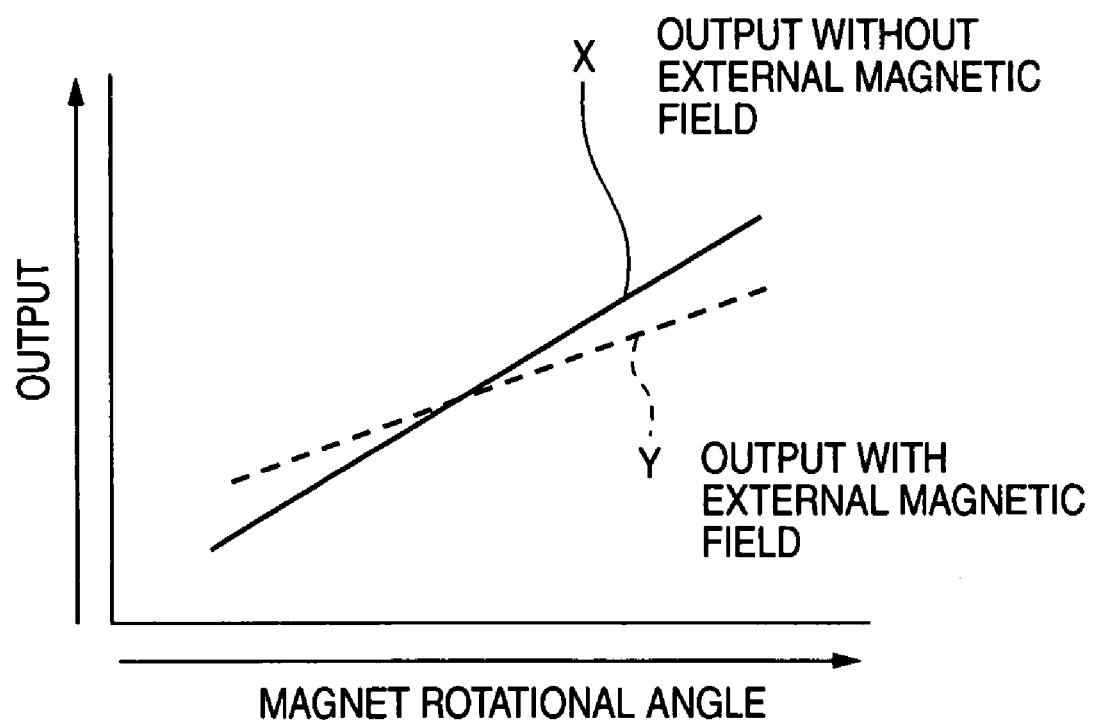
FIG. 8 is a characteristic drawing illustrating output characteristics of the non-contact type liquid level sensor according to the existence and non-existence of an external magnetic field.

On the other hand, the non-contact liquid level sensor 20, which is constructed as has been described above, is subjected to the exposure to the liquid together with a fuel pump which sends out liquid such as gasoline within the fuel tank towards the outside thereof. Consequently, the stators 24 and the magnetoelectric converting element 25 provided in the non-contact type liquid level sensor 20 are affected by the external magnetic field resulting from the fuel pump which constitutes a magnetic field generating source, and the output characteristics of the magnetoelectric converting element 25 change and become unstable remarkably as has been described with respect to FIG. 8 when the fuel pump is in operation, when compared with a time when the fuel pump is not in operation.

Figure 4:
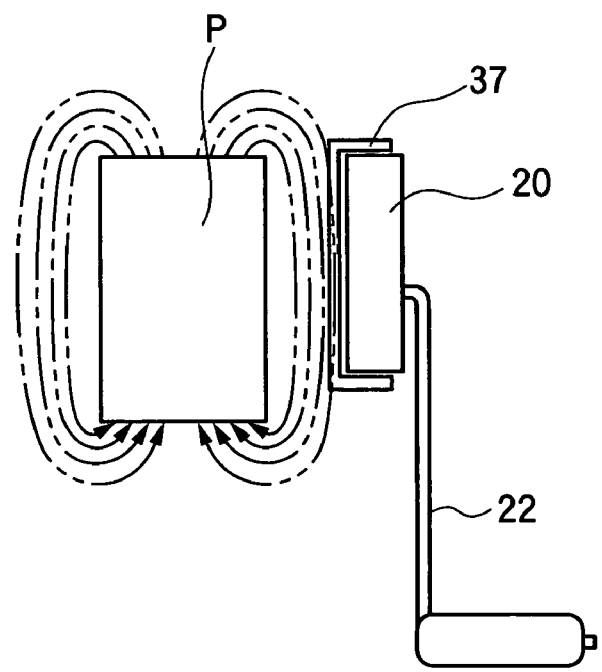
FIG. 4 is a side view showing effects from a magnetic field onto the non-contact type liquid level sensor of the invention.
Figure 5:
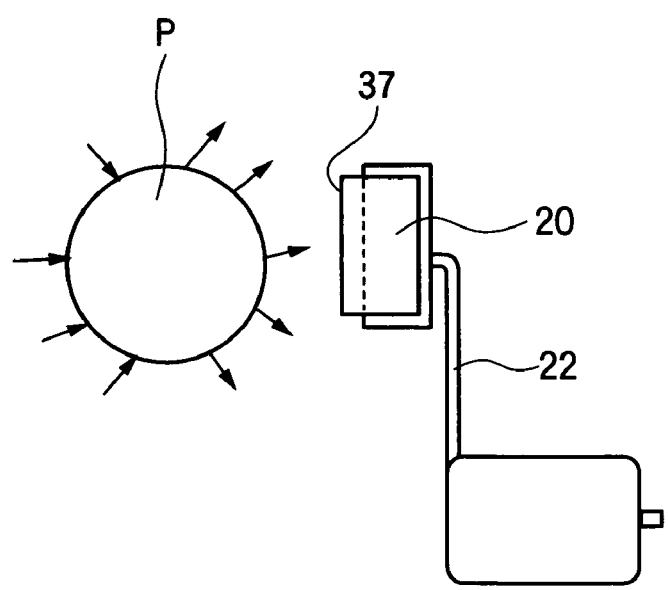
FIG. 5 is a plan view showing the effects from the magnetic field onto the non-contact type liquid level sensor of the invention.
Figure 6:
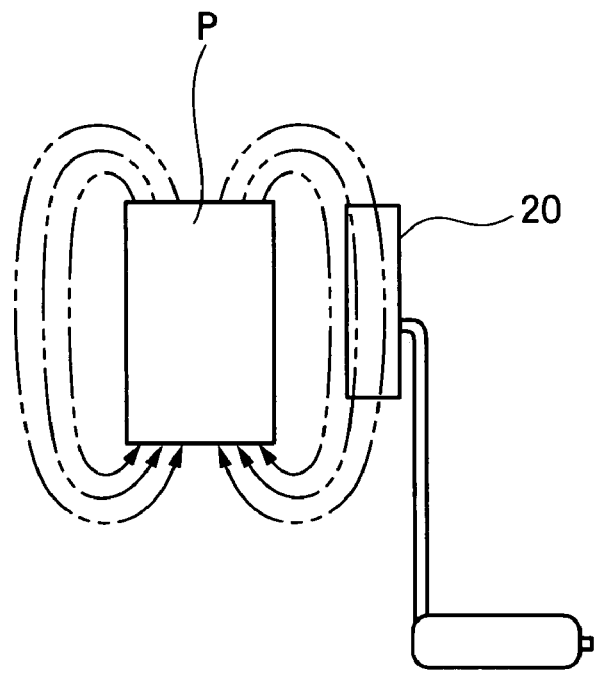
FIG. 6 is a side view showing effects from a magnetic field onto a related non-contact type liquid level sensor.
Figure 7:
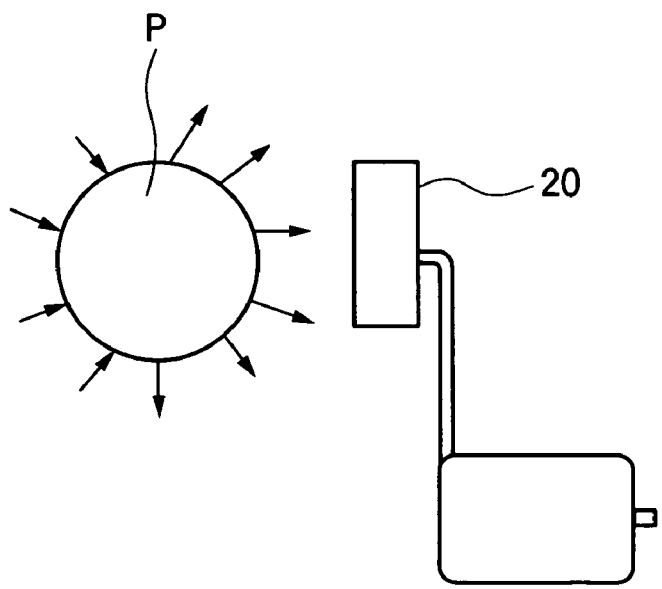
FIG. 7 is a plan view showing the effects from the magnetic field onto the related non-contact type liquid level sensor.

In the invention, by placing the electromagnetic shield plate 37, the external magnetic field from the fuel pump can be blocked through electromagnetic shielding, and therefore, magnetoelectric conversion outputs which are similar to those resulting when there are no effect from the external magnetic field can be obtained whether or not the fuel pump is in operation. FIGS. 4 and 5 illustrate how the magnetic field from the pump module P is blocked through electromagnetic shielding. Here, lines of magnetic force are deflected in such manner that they do not pass through the interior of the non-contact type liquid level sensor 20 by means of the electromagnetic shield plate 37.

Consequently, the quantity of remaining liquid that is to be measured based on an output from the magnetoelectric converting element 25 can be displayed on a measuring instrument with accuracy. In addition, the external magnet field is generated not only from the fuel pump but also from the electric systems and magnetic materials existing on the periphery of the sensor. The intrusion of the external magnetic field so generated by the other components than the fuel pump into the magnetoelectric converting elements 25 can also be prevented by the electromagnetic shield plate 37.

As a result, the output voltage of the magnetoelectric converting element in association with a change in liquid level or the measurement value of the liquid level becomes highly reliable.

In addition, since the electromagnetic shield plate 37 has the notched portion 39 in the vicinity of the location which faces the magnet 23 and the rotational shaft 36, the electromagnetic shield plate 37 itself can avoid the deflection of the flow of magnetic field which exits from the N pole of the magnet and returns to the S pole thereof (the line of magnetic force). As a result, the magnetic field of the magnet can be allowed to reach the stators 24 and the magnetoelectric converting element 25 effectively.

This effectiveness can also be obtained by providing the whole of the electromagnetic shield plate 37 at a position which is spaced apart further from the magnet 23 and the rotational shaft 36. Consequently, in a case where the electromagnetic shield plate 37 is allowed to provided sufficiently apart from the magnet 23, the electromagnetic shield plate 37 may be constructed so as to cover the whole of the magnet 23 and the rotational shaft 36. As this occurs, the effects of the external magnetic field can be blocked in an ensured fashion.

While the embodiment has been described as the electromagnetic shield plate 37 being provided only on the one side of the housing 21, in the event that the magnetic shield plate 37 is provided on both sides of the housing or in such a manner as to enclose substantially the whole of the housing, the shielding effect with respect to the external magnetic field can be enhanced further. Note that the electromagnetic shield plate 37 may be constructed so as to be molded into the housing 21, and in this case, too, the similar electromagnetic shielding function can be obtained.

According to the embodiment of the invention, by mounting the electromagnetic shield plate 37 on the housing 21 which prevents the effects of the external magnetic field onto the magnetoelectric converting element 25, the direct effects of the external magnetic field onto the stators and magnetoelectric converting element can be prevented.

Due to this, only the magnetic field that is generated by the magnet 23 can be applied to the magnetoelectric converting element 25 via the stators 24. Consequently, the output characteristics of the magnetoelectric converting element 25 can also be stabilized, thereby making it possible to enhance the measuring accuracy of a liquid level changing in association with the movement of the float.

In addition, since the electromagnetic shield plate 37 has the shape which imposes no effect onto the magnetic field of the magnet 23 and is disposed at the position where no effect is imposed on the magnetic field of the magnet 23, the deflection of the magnetic field of the magnet 23 due to the electromagnetic shield plate 37 acting as the flux path can be prevented, whereby the magnetic field of the magnet 23 can be converged only to the stators and the magnetoelectric converting element 25. Consequently, the reduction in output sensitivity of the magnetoelectric converting element 25 can be prevented.

Additionally, in the event that let the magnetoelectric converting element 25 be made up of a Hall-effect IC, since the magnetoelectric conversion output can be processed by the internal IC, the output can be outputted to a measuring instrument as a signal which is corrected to a liquid level value.

Furthermore, by letting the Hall-effect IC have a memory to which information for magnetoelectric converting characteristics correction can be written, a magnetic flux detection signal corresponding to the measuring instrument can be outputted only from the magnet 23 in a state that the electromagnetic shield plate is mounted. Due to this, the display of an accurate liquid level can be implemented similarly to a case where there is provided no electromagnetic shield plate 37.

What is claimed is:

1. A non-contact type liquid level sensor comprising:
   a housing;
   a rotational shaft that is rotatably provided in the housing;
   a magnet that is fixed to an outer circumferential surface of the rotational shaft in such a manner as to rotate together with the rotational shaft;
   a pair of stators that are disposed in the housing so as to face to an outer circumferential surface of the magnet;
   a magnetoelectric converting element, which is disposed in the housing, for detecting a change in magnetic flux density that occurs within the stators in association with the rotation of the magnet, converting the change into an electric signal and outputting the electric signal; and
   an electromagnetic shield plate that is mounted on the housing, and prevents the magnetoelectric converting element from being affected by an external magnetic field,
   wherein the electromagnetic shield plate has a shape conserving a magnetic field of the magnet.

2. A non-contact type liquid level sensor comprising:
   a housing;
   a rotational shaft that is rotatably provided in the housing;
   a magnet that is fixed to an outer circumferential surface of the rotational shaft in such a manner as to rotate together with the rotational shaft;
   a pair of stators that are disposed in the housing so as to face to an outer circumferential surface of the magnet;
   a magnetoelectric converting element, which is disposed in the housing, for detecting a change in magnetic flux density that occurs within the stators in association with the rotation of the magnet, converting the change into an electric signal and outputting the electric signal; and
   an electromagnetic shield plate that is mounted on the housing, and prevents the magnetoelectric converting element from being affected by an external magnetic field, wherein the electromagnetic shield plate has a notched portion facing the magnet and the rotational shaft.

3. A non-contact type liquid level sensor comprising:

a housing;

a rotational shaft that is rotatably provided in the housing;

a magnet that is fixed to an outer circumferential surface of the rotational shaft in such a manner as to rotate together with the rotational shaft;

a pair of stators that are disposed in the housing so as to face to an outer circumferential surface of the magnet;

a magnetoelectric converting element, which is disposed in the housing, for detecting a change in magnetic flux density that occurs within the stators in association with the rotation of the magnet, converting the change into an electric signal and outputting the electric signal; and an electromagnetic shield plate that is mounted on the housing, and prevents the magnetoelectric converting element from being affected by an external magnetic field, wherein the electromagnetic shield plate is disposed at a position conserving a magnetic field of the magnet.

* * * * *